(12) United States Patent
Avitzour

(10) Patent No.: US 12,210,112 B2
(45) Date of Patent: Jan. 28, 2025

(54) METHOD AND SYSTEM FOR RADIOLOCATION AT REDUCED DATA TRANSFER

(71) Applicant: Hoopo Systems Ltd., Glil-Yam (IL)

(72) Inventor: Daniel Avitzour, Jerusalem (IL)

(73) Assignee: Hoopo Systems Ltd., RaAnana (IL)

( * ) Notice: Subject to any disclaimer, the term of this patent is extended or adjusted under 35 U.S.C. 154(b) by 180 days.

(21) Appl. No.: 17/289,849

(22) PCT Filed: Oct. 30, 2019

(86) PCT No.: PCT/IL2019/051173
§ 371 (c)(1),
(2) Date: Apr. 29, 2021

(87) PCT Pub. No.: WO2020/089899
PCT Pub. Date: May 7, 2020

(65) Prior Publication Data
US 2021/0405146 A1     Dec. 30, 2021

Related U.S. Application Data

(60) Provisional application No. 62/753,941, filed on Nov. 1, 2018.

(51) Int. Cl.
*G01S 5/02* (2010.01)
*G01S 5/04* (2006.01)
(Continued)

(52) U.S. Cl.
CPC ..................... *G01S 5/06* (2013.01);
*G01S 5/04* (2013.01); *G01S 5/0009* (2013.01);
*G01S 5/0036* (2013.01); *G01S 5/0205* (2013.01)

(58) Field of Classification Search
CPC ........ G01S 5/0009; G01S 5/0036; G01S 5/04;
G01S 5/06; G01S 5/0205; G01S 5/02;
H04W 64/00
(Continued)

(56) References Cited

U.S. PATENT DOCUMENTS 6,018,312 A    1/2000  Haworth
6,700,536 B1 *  3/2004  Wiegand ............... G01S 3/50
                                                342/417
(Continued)

FOREIGN PATENT DOCUMENTS

CN    1080059 A  * 12/1993  ........... G01S 19/215
FR    3046326 A1 *  6/2017  ........... G01S 5/0009
(Continued)

OTHER PUBLICATIONS

Supplementary European Search Report and the European Search Opinion Dated Jul. 18, 2022 From the European Patent Office Re. Application No. 19880839.6. (9 Pages).
(Continued)

*Primary Examiner* — Chuong P Nguyen

(57) ABSTRACT

A system for estimating a location of a source transmitting a signal having a known modulation standard comprises a plurality of signal receiving circuits, each configured to receive the signal, to generate a denoised version of the signal, and to extract from the denoised version of the signal a set of signal parameters sufficient to at least partially reconstruct the denoised version of the signal. The system can also comprise a central processor circuit that receives the set of signal parameters from each signal receiving circuit and estimates the location of the source based on the signal parameters.

23 Claims, 2 Drawing Sheets

(51) Int. Cl.
*G01S 5/06* (2006.01)
*G01S 5/00* (2006.01)

(58) Field of Classification Search
USPC .......................................................... 342/450
See application file for complete search history.

(56) References Cited

U.S. PATENT DOCUMENTS

| | | | |
|---|---|---|---|
| 10,338,189 B2 * | 7/2019 | O'Shea | G01S 5/0036 |
| 10,545,216 B2 * | 1/2020 | Avitzour | G01S 5/0278 |
| 10,578,704 B1 * | 3/2020 | Fernandez | G01S 5/0081 |
| 11,187,778 B2 * | 11/2021 | Avitzour | G01S 5/04 |
| 12,050,274 B2 * | 7/2024 | Farrokhi | G01S 19/07 |
| 2003/0016174 A1 | 1/2003 | Anderson | |
| 2003/0017832 A1 | 1/2003 | Anderson | |
| 2018/0083656 A1 | 3/2018 | Ray | |

FOREIGN PATENT DOCUMENTS

| | | | | |
|---|---|---|---|---|
| WO | WO 2001/053848 | 7/2001 | | |
| WO | WO 2017/122206 | 7/2017 | | |
| WO | WO-2017122206 A1 * | 7/2017 | .......... | G01S 1/0428 |
| WO | WO 2020/089899 | 5/2020 | | |

OTHER PUBLICATIONS

Bottomley et al. "Mitigating Radio Emitter Clock Offset in Detection and Geolocation", IEEE Transactions on Aerospace and Electronic Systems, XP011585650, 51(2): 1583-1590, Apr. 1, 2015.
International Preliminary Report on Patentability Dated May 14, 2021 From the International Bureau of WIPO Re. Application No. PCT/IL2019/051173. (9 Pages).
International Search Report and the Written Opinion Dated Mar. 9, 2020 From the International Searching Authority Re. Application No. PCT/IL2019/051173. (15 Pages).

* cited by examiner

METHOD AND SYSTEM FOR RADIOLOCATION AT REDUCED DATA TRANSFER

RELATED APPLICATIONS

This application is a National Phase of PCT Patent Application No. PCT/IL2019/051173 having International filing date of Oct. 30, 2019, which claims the benefit of priority under 35 USC § 119 (e) of U.S. Provisional Patent Application No. 62/753,941 filed on Nov. 1, 2018. The contents of the above applications are all incorporated by reference as if fully set forth herein in their entirety.

FIELD AND BACKGROUND OF THE INVENTION

The present invention, in some embodiments thereof, relates to radiolocation and, more particularly, but not exclusively, to a method and system for estimating the location of a source at reduced data transfer.

Mobile communications have changed the way people communicate and mobile phones have been transformed from a luxury item to an essential part of every day life. The use of mobile phones is today dictated by social situations, rather than hampered by location or technology. Aside for voice connections, the mobile Internet continues to filter further into the fabric of everyday life.

Advanced cellular networks have been specifically designed to fulfill demands of the mobile Internet. As these services grow in popularity and usage, factors such as cost efficient optimization of network capacity and quality of service have become desired. These factors may be achieved with careful network planning and operation, improvements in transmission methods, and advances in receiver techniques. In this regard, networks based on wideband code division multiple access (WCDMA) technology make the delivery of data to end users a feasible option.

Locating sources within a wireless communication system enables features such as location-based services and location-aware management. A number of techniques have been proposed for radiolocation. These can be categorized as either direct radiolocation techniques or indirect radiolocation techniques. In the direct radiolocation techniques, also known as Direct Position Determination (DPD) techniques, the location of the source is estimated in one step, directly from the received signals. Indirect radiolocation is done in two stages. In a first stage, signal propagation parameters, such as Received Signal Strength Indication (RSSI), Time of Arrival (TOA) and Time Difference Of Arrival (TDOA) between different receiving stations are estimated. In a second stage, the location is estimated based on the parameters obtained in the first stage.

Some techniques are based on an exact knowledge of the transmitted signal waveform. These techniques are referred to as "known-signal techniques." Other techniques do not utilize such information, and are referred to as "unknown-signal techniques." Generally speaking, known-signal techniques perform better than unknown signal techniques, and direct techniques perform better than indirect techniques.

International publication No. WO2017/122206, the contents of which are hereby incorporated by reference discloses a system for estimating a location of a source transmitting a spectral-diversity signal having a known form but one or more unknown parameters. A plurality of signal receiving circuits receive the spectral-diversity signal and compute, a cross-ambiguity function for each signal carrier component in the signal based on the known form and on the received spectral-diversity signal. A central processor circuit receives data pertaining to the cross-ambiguity functions computed by the signal receiving circuits, estimates the location of the source by calculating an extremum of an objective function constructed from all the cross-ambiguity functions.

SUMMARY OF THE INVENTION

According to an aspect of some embodiments of the present invention there is provided a system for estimating a location of a source transmitting a signal having a known modulation standard. The system comprises a plurality of signal receiving circuits, each configured to receive the signal, to generate a denoised version of the signal, and to extract from the denoised version of the signal a set of signal parameters sufficient to at least partially reconstruct the denoised version of the signal. The system can also comprise a central processor circuit configured to receive the set of signal parameters from each signal receiving circuit and to estimate the location of the source based on the signal parameters.

According to some embodiments of the invention the signal receiving circuit is configured for generating the denoised version of the signal by demodulating the received signal to provide a set of modulating bits encoded in the received signal, re-modulating the set of modulating bits to provide a synthetic signal, parameterizing deformations of the received signal relative to the synthetic signal, and deforming the synthetic signal according to the parameterization to generate the denoised version of the signal.

According to some embodiments of the invention the set of parameters comprises parameters describing the deformation.

According to some embodiments of the invention the signal comprises a plurality of signal bursts, each characterized by a separate carrier frequency, wherein the receiving circuit is configured for generating a denoised version separately for each signal burst.

According to some embodiments of the invention the signal comprises a plurality of signal bursts, each characterized by a separate carrier frequency and different modulating bits, wherein the receiving circuit is configured for generating a denoised version separately for each signal burst.

According to some embodiments of the invention the central processor circuit is configured to access a computer-readable medium for receiving timing-frequency scheduling of the signal bursts, and to classify sets of signal parameters according to the signal receiving circuits.

According to some embodiments of the invention the system comprises a reference source transmitting a reference signal, wherein each signal receiving circuit is configured to generate a denoised version of the reference signal, and to extract from the denoised version of the reference signal a set of reference signal parameters sufficient to at least partially reconstruct the denoised version of the reference signal, and wherein the central processor circuit is configured to estimate the location of the source also based on the reference signal parameters and on the location of the reference source.

According to some embodiments of the invention the central processor circuit is configured to correct a timing offset among the signal receiving circuits based on the reference signal parameters.

According to some embodiments of the invention the central processor circuit is configured to correct a frequency offset among the signal receiving circuits based on the reference signal parameters.

According to some embodiments of the invention the estimation is an indirect estimation, and the central processor circuit is configured to calculate, based on the sets of signal parameters, Time Difference Of Arrival (TDOA) values between pairs of signal receiving circuits, and to estimate the location based on the TDOA values.

According to some embodiments of the invention the central processor circuit is configured to calculate, based on the sets of signal parameters, FDOA values between pairs of signal receiving circuits, and to estimate a velocity of the source based on the FDOA values.

According to some embodiments of the invention the central processor circuit is configured to access a database storing a digital terrain map describing height data of sources and to extract from the map a height of the source, and wherein the estimation based is executed in two spatial dimensions and combined with the extracted height.

According to an aspect of some embodiments of the present invention there is provided a method for estimating a location of a source transmitting a signal having a known modulation standard. The method comprises receiving a set of signal parameters from each of a plurality of signal receiving circuits, and estimating the location of the source based on the signal parameters. The present invention set of signal parameters is optionally and preferably sufficient to at least partially reconstruct a denoised version of a signal received at a respective signal receiving circuit.

According to some embodiments of the invention the set of parameters comprises the set of modulating bits encoded by the received signal.

According to some embodiments of the invention the set of parameters comprises parameters describing a deformation of the received signal relative to a synthetic signal generated by re-modulating the set of modulating bits.

According to some embodiments of the invention the signal comprises a plurality of signal bursts, and wherein the method comprises receiving from each of the plurality of signal receiving circuits a separate set of signal parameters for each signal burst.

According to some embodiments of the invention the method comprises accessing a computer-readable medium for receiving timing-frequency scheduling of the signal bursts, and classifying sets of signal parameters according to the signal receiving circuits.

According to some embodiments of the invention the method comprises receiving from at least one of the plurality of signal receiving circuits a set of reference signal parameters sufficient to at least partially reconstruct a denoised version of a reference signal transmitted by a reference source and received by the at least one signal receiving circuit, wherein the estimation of the location of the source is also based on the reference signal parameters an on a location of the reference source.

According to some embodiments of the invention the method comprises correcting a timing offset among the signal receiving circuits based on the reference signal parameters.

According to some embodiments of the invention the method comprises correcting a frequency offset among the signal receiving circuits based on the reference signal parameters.

According to some embodiments of the invention the estimation is an indirect estimation, and the method comprises calculating, based on the sets of signal parameters, Time Difference Of Arrival (TDOA) values between pairs of signal receiving circuits, and estimating the location based on the TDOA values.

According to some embodiments of the invention the method comprises calculating, based on the sets of signal parameters, FDOA values between pairs of signal receiving circuits, and estimating a velocity of the source based on the FDOA values.

According to some embodiments of the invention the method comprises accessing a database storing a digital terrain map describing height data of sources and extracting from the map a height of the source, wherein the estimation is executed in two spatial dimensions and combined with the extracted height.

According to an aspect of some embodiments of the present invention there is provided a method of generating signal information for estimating a location of a source transmitting a signal having a known modulation standard. The method comprises generating a denoised version of the signal; extracting from the denoised version of the signal a set of signal parameters sufficient to at least partially reconstruct the denoised version of the signal; and transmitting the set of signal parameters, but not the signal to a central processor circuit for estimating the location of the source based on the signal parameters.

According to some embodiments of the invention the denoised version of the signal is the generated by: demodulating a baseband of the received signal to provide a set of modulating bits encoded by the received signal; re-modulating the set of modulating bits to provide a synthetic signal; parameterizing a deformation of the received signal relative to the synthetic signal; and deforming the synthetic signal according to the parameterized deformation to generate the denoised version of the signal. According to some embodiments of the invention the set of parameters comprises the set of modulating bits. According to some embodiments of the invention the set of parameters comprises parameters describing the deformation.

According to some embodiments of the invention the signal comprises a plurality of signal bursts, each characterized by a separate frequency, wherein the method comprises generating a denoised version separately for each signal burst.

According to some embodiments of the invention the signal comprises a plurality of signal bursts, each characterized by a separate frequency and different modulating bits, and wherein the method comprises generating a denoised version separately for each signal burst.

According to some embodiments of the invention the method comprises receiving a reference signal from a reference source transmitting the reference signal; generating a denoised version of the reference signal; extracting from the denoised version of the reference signal a set of reference signal parameters sufficient to at least partially reconstruct the denoised version of the reference signal; and transmitting the set of reference signal parameters to the central processor circuit for estimating the location of the source, based on the reference signal parameters and on a location of the reference source.

According to some embodiments of the invention the reference signal is a digital signal.

According to some embodiments of the invention the set of parameters comprises at least one a phase of the signal, a frequency of the signal, amplitude of the signal, and time of arrival of the signal.

According to some embodiments of the invention the amplitude is a complex amplitude.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
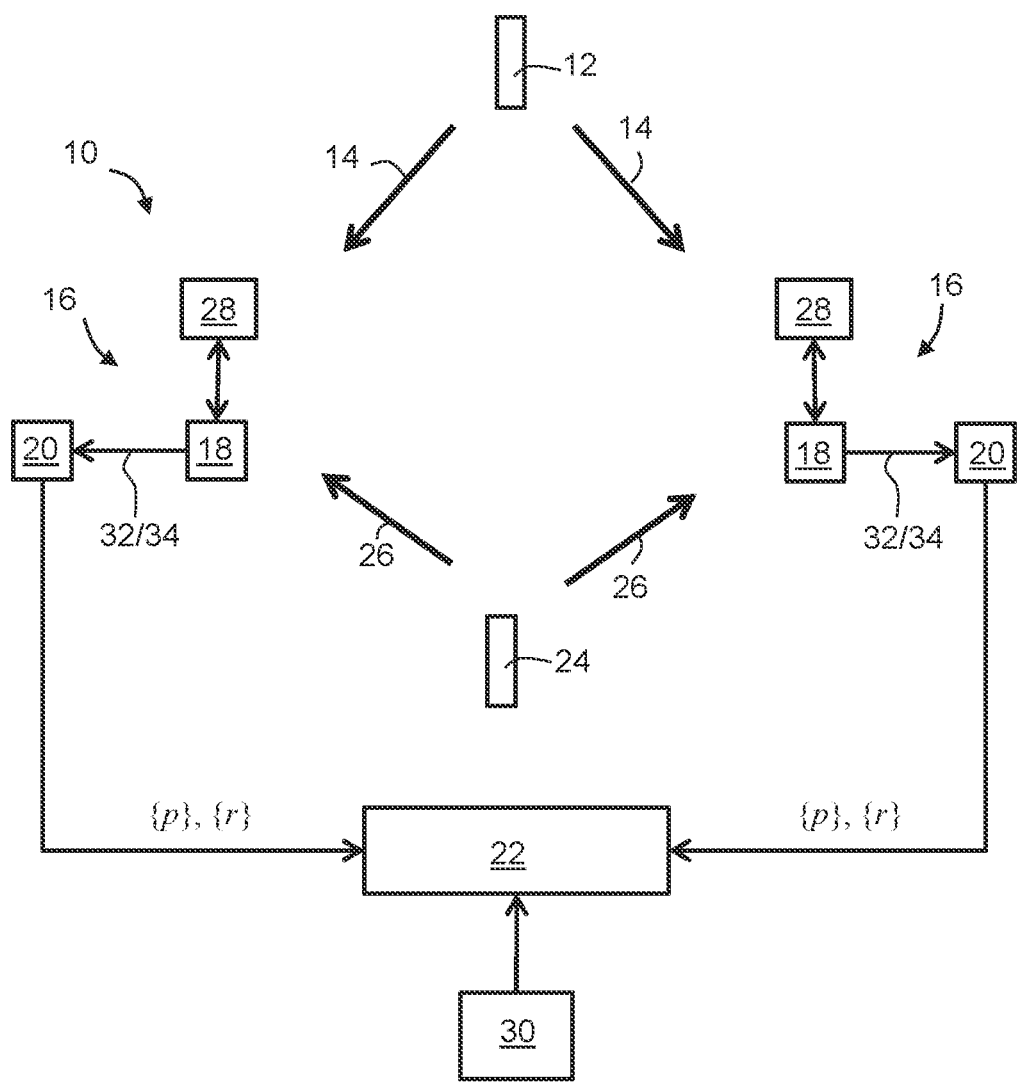
FIG. 1 is a schematic illustration of a system suitable for estimating a location of a source transmitting a signal, according to some embodiments of the present invention.

The present invention, in some embodiments thereof, relates to radiolocation and, more particularly, but not exclusively, to a method and system for estimating the location of a source at reduced data transfer.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Reference is now made to FIG. 1 which is a schematic illustration of a system 10 suitable for estimating a location of a source 12 transmitting a signal 14, according to some embodiments of the present invention. Source 12 can be stationary or mobile as desired. The signal 14 is shown as two arrows in FIG. 1 to illustrate that it propagates in space (for example, along a spherical wave-front). Typically, signal 14 is a digital signal.

Signal 14 typically has a known modulation standard.

A modulation standard, as used herein, refers to a rule or a set of rules that mapping a set of bits to analog waveforms that constitute a baseband signal s(t).

While the embodiments below are described with a particular emphasis to baseband processing, it is to be understood that some embodiments of the present embodiments encompass also processing of IF, such as, but not limited to, low IF. One of ordinary skills in the art, provided with the details described herein would know how to adjust the process of the present invention for the case of IF processing.

The bits that are mapped by the modulation standard are referred to herein as "modulating bits," and the analog waveforms into which the modulating bits are mapped are referred to herein as "symbols."

Representative examples of modulation standards suitable for the present embodiments include, without limitation, OFDM, LoRa and QAM. Oftentimes, the symbols are termed according to the modulation standard that creates them. Thus, when the modulation standard is OFDM, it maps the set of bits to OFDM symbols, when the modulation standard is LoRa, it maps the set of bits to LoRa symbols, when the modulation standard is QAM, it maps the set of bits to QAM symbols, etc.

One or more parameters of the signal can be unknown or partially known (e.g., within some margins of accuracy). For example, unknown or partially known modulating bits, unknown or partially known frequency, unknown or partially known amplitude, and unknown or partially known phase. The transmitted symbols of the signal s(t) can in some cases deviate from their nominal form, for example, due to inaccuracies and/or deformities of the transmitter, and/or due to some flexibility allowed within the modulation standard. An example is a case where the symbols are linear frequency modulated (chirps) but the exact rate of change in a chirp is not known. Another example is a case in which the clock rate of the transmitter has an unknown drift relative to the clock rate of the receiver.

System 10 typically comprises a plurality of signal receiving circuits 16, each configured to receive the signals 14. Signal receiving circuits 16 are optionally and preferably stationary, but embodiments in which there is a relative motion of circuits 16 relative to source 12 are also contemplated. Two signal receiving circuits are illustrated in FIG. 1, but it is to be understood that the present embodiments contemplate any number of signal receiving circuits. The signal receiving circuits may be physically separate receivers. The signal receiving circuits may be receivers tuned to different carrier frequencies at different times, or they may be implemented as a single wideband receiver followed by appropriate digital processing.

One or more (e.g., each) of signal receiving circuits 16 can comprise a denoising circuit 18 that generates a denoised version 32 of signal 14, and a digital signal processing circuit 20 that process the denoised version 32. A preferred procedure that can be executed by denoising circuit 18 for generating denoised version 32 of signal 14 will now be explained, although other procedures may also be employed. One or more of the operation below can alternatively be executed by digital signal processing circuit 20.

Firstly, the baseband of signal 14 is demodulated.

This can be done by a hardware element embedded in circuit 18, or software comprising computer-readable instructions stored on a computer-readable memory (not shown) accessible by circuit 18, in which case circuit 18 is configured to read the computer-readable instructions and carry out the demodulation. The demodulation provides an estimate of the sequence of modulation bits that have led, through the known modulation standard, to the signal 14. The demodulation technique can optionally and preferably include error correction.

Once the sequence of modulating bits is obtained, the estimated modulating bits are used to form a synthetic baseband signal, using a modulation standard. The modulation standard is optionally and preferably the same as the known modulation standard so that the synthetic baseband signal is free of noise, interference and any deformation from the known modulation standard, which may have been generated due to non-ideality of the transmitting device, the propagation channel and/or the receiving device.

The synthetic signal can serve for parameterizing the deformation of signal 14 generated by one or more of the aforementioned non-idealities. This is typically done by comparing the synthetic signal with signal 14 and estimating from this comparison a plurality of deformation parameters. In some embodiments of the present invention the parameterization comprises a function of the time, such as, but not limited to, a polynomial function of the time, estimated such that the multiplication between the synthetic signal and the function substantially estimates signal 14 with mean square deviation that is less than a mean square deviation threshold. The mean square deviation threshold can be 50% or 40% or 30% or 20% or 10% or less.

Once the modulation deformation is parametrized and the deformation parameters are known, the synthetic signal is deformed according to the estimated deformation parameters.

The deformed synthetic signal can then be compared with the received signal 14. The comparison is according to at least one signal characteristic selected from the group consisting of time, frequency and phase, more preferably according to each of these signal characteristics. The deformed synthetic signal can then be shifted in terms of the one or more signal characteristics that were used for the comparison, to form a shifted deformed synthetic signal 32 that is substantially aligned (e.g., with mean square deviation less than 50% or less than 40% or less than 30% or less than 20% or less than 10% or less) with the received signal 14. The shifted deformed synthetic signal 32 is a denoised version of signal 14 in the sense that it has a reduced amount, and optionally and preferably is substantially free of, noise, interference and multipath effects.

The shifted deformed synthetic signal version 32 therefore has a higher Signal to Interference and Noise Ratio (SINR) compared to signal 14. The improvement in SINR also ensures higher accuracy for a location estimation based on this denoised version.

In some cases, signal 14 comprises a plurality of signal bursts, each transmitted at a different time and is characterized by a separate carrier frequency. Typically, the amplitude and phase of each burst is not dictated by the modulation standard. In these cases, each of receiving circuits 16 preferably generates the shifted deformed synthetic signal 32 separately for each signal burst. This can be done, for example, by applying a filter bank 28 to each burst so as to produce baseband versions of the burst, and repeating the above procedure for the produced baseband versions of the burst.

The shifted deformed synthetic signal 32 is optionally and preferably transmitted to digital signal processing circuit 20, that extracts from shifted deformed synthetic signal 32 a set {p} of signal parameters. Representative examples of signal parameters that can be extracted and included in set {p} include, without limitation, the set of modulating bits encoded in signal 14, the deformation parameters, the frequency of the signal 14, time of arrival of signal 14. Preferably, two or more, more preferably three or more, more preferably four or more, for example, all the above parameters are extracted and included in set {p}. In various exemplary embodiments of the invention the extracted parameters are sufficient to at least partially reconstruct the denoised version of signal 14.

System 10 optionally and preferably comprises a central processor circuit 22 that receives from circuits 16 the set {p} of parameters, and estimates the location of source 12. Preferably, central processor circuit 22 does not receive signal 14 from circuits 16. More preferably, central processor circuit 22 does not receive any of signals 14 and its denoised version 32 from circuits 16. The advantage of these embodiments is that they significantly reduce the amount of data that needs to be transferred to central processor circuit 22. In some embodiments of the present invention the set {p} of parameters is transmitted from circuits 16 to circuit 22 in a compressed form, so as to further reduce the load on the transmission.

Thus, the present embodiments provide an improved accuracy with a reduced data transmission load. This is a significant advantage over known radiolocation systems, since prior to the discovery of the present inventor, data transmission load and high accuracy were assumed to be conflicting properties, so that some compromise had to be made with respect to one property in order to improve the other.

In cases in which the circuits 16 generate the denoised versions separately for each signal burst, each of the sets {p} of parameters also includes a time-tag for the respective signal receiving circuits 16 and central processor circuit 22 optionally and preferably uses the time tags for classifying sets of signal parameters according to signal receiving circuits 16. That is to say, based on the time tags, the central processor circuit 22 associates between two or more, more preferably all, sets of signal parameters that were transmitted by the same signal receiving circuits 16. In some embodiments of the present invention central processor circuit 22 associates signal bursts with the same or similar modulating bits, the same or similar frequency, and/or sufficiently close near time tags with the same signal receiving circuit.

The estimation performed by central processor circuit 22 is typically an indirect estimation in which case central processor circuit 22 calculates, based on the set {p} TDOA values between pairs of signal receiving circuits 16, and then estimates the location based on the calculated TDOA values, for example, by least-squares fitting of the TDOA values to distance differences from source 12 to circuits 16.

In some embodiments of the present invention central processor circuit 22 calculates, based on the set {p}, Frequency Difference Of Arrival (FDOA) values between pairs of signal receiving circuits, and estimates a velocity of the source based on FDOA values.

Techniques suitable for estimating a location and/or velocity based on TDOA and/or FDOA are found, for example, in B. Friedlander, "A passive localization algorithm and its accuracy analysis", IEEE Journal on Oceanic Engin., Vol. 12, No. 1, pp. 234-245, January 1987, and K. C. Ho, and W. Xu, "An accurate algebraic solution for moving source location using TDOA and FDOA measurements", IEEE Trans. on Sig. Proc., Vol. 52, No. 93, pp. 2453-2463, September 2004.

Central processor circuit 22 typically provides the location of the source 12 as a three-dimensional spatial vector z consisting, for example of latitude, longitude and optionally also altitude values, wherein at least one, or more preferably at least two of the components of this vector are estimated based on the set {p}. When central processor circuit 22 estimates two components of z based on the set {p}, these components typically span a horizontal plane (e.g., perpendicular to the gravitation direction). In these embodiments, central processor circuit 22 can access a database storing a digital terrain map describing height data of sources, extracts from the map the third dimension (e.g., height) of the source, and combine the estimated components with the extracted component to form the three-dimensional vector z. The database storing the digital terrain map can be recorded on memory medium 30. When central processor circuit 22 estimates all three components of z based on the set {p}, there is no need to extract a component from a digital terrain map. Use of a digital terrain map is advantageous since it reduces the dimensionality of the variable space.

In some embodiments of the present invention system 10 comprises one or more reference sources 24 transmitting a signal 26 having a predetermined form. Reference source(s) 24 is optionally and preferably stationary at a known location, e.g., a known location relative to the location of central processor circuit 22. The reference signal 26 need not to have the same form as the known form s(t) of signal 14. Preferably, reference signal 26 is a digital signal. Reference signal 26 can be transmitted continuously or upon request from the central processor circuit 22.

One or more, preferably each, of signal receiving circuit 16 receives reference signal 26 and generates, e.g., by means of denoising circuit 18, a denoised version 34 of reference signal 26, typically in the same manner as described above regarding signal 14. The denoised version 34 can be transmitted to digital signal processing circuit 20, for extracting from the denoised version 34 a set {r} of reference signal parameters, as further detailed hereinabove with respect to set {r}. Typically, but not necessarily, both sets {p} and {r} preferably contain the same types of parameters.

Central processor circuit 22 preferably receives set {r} of reference signal parameters. In these embodiments, the estimate of the location of source 12 is preferably also based on set {r}. The set {r} can be used for correcting a timing offset among the signal receiving circuits 16. For example, central processor circuit 22 can estimate time-related measures (e.g., time of arrival values, TDOA values), between pairs of signal receiving circuits 16 based on the set {r}, and use the difference between these time-related measures as a timing offset between the respective signal receiving circuits

16. The set {r} can be used for correcting a frequency offset among the oscillators of the signal receiving circuits 16, which adds a superfluous (not motion-related) frequency difference between signal at different receiving stations. For example, when the reference source 24 is stationary, the true FDOA between signal receiving circuits 16 is zero, and so when a non-zero FDOA is estimated by central processor circuit 22 for the set {r}, it can determine that the difference between the true FDOA and the FDOA as estimated for the set {r} is the frequency offset between the respective oscillators and can use this to correct the FDOA estimate for the set {p}.

Signal receiving circuits 16 can be deployed in any spatial arrangement. Preferably, the stations are deployed such as to achieve high received power and a variety of reception directions. For example, if the purpose of a system is to locate sources confined to an area which has a square shape, then it is preferred to deploy the stations so they are evenly distributed along the perimeter of this square, and to deploy a reference transmitter in the center of the square area.

Figure 2:
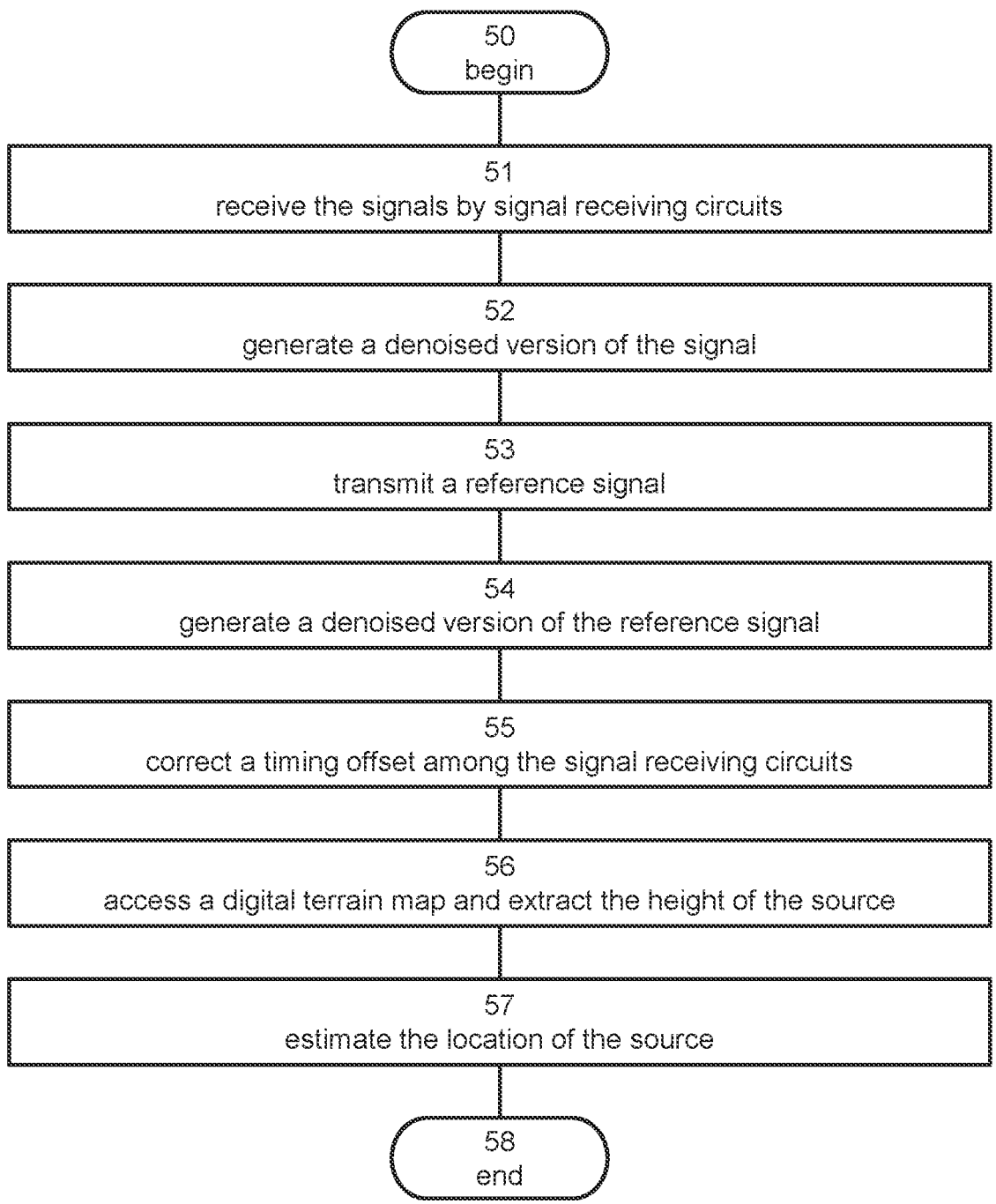
FIG. 2 is a flowchart diagram of a method of estimating a location of a source transmitting signals according to some embodiments of the present invention.

FIG. 2 is a flowchart diagram of a method of estimating a location of a source (e.g., source 12) transmitting signals (e.g., signals 14) according to some embodiments of the present invention. It is to be understood that, unless otherwise defined, the operations described hereinbelow can be executed either contemporaneously or sequentially in many combinations or orders of execution. Specifically, the ordering of the flowchart diagrams is not to be considered as limiting. For example, two or more operations, appearing in the following description or in the flowchart diagrams in a particular order, can be executed in a different order (e.g., a reverse order) or substantially contemporaneously. Additionally, several operations described below are optional and may not be executed.

The method begins at 50 and optionally and preferably continues to 51 at which the signals are received by a plurality of signal receiving circuits (e.g., circuits 16). The method can continue to 52 at which a denoised version of the signal is generated, as further detailed hereinabove. In some embodiments of the present invention, the method proceeds to 53 at which a reference signal (e.g., signal 26) is transmitted, as further detailed hereinabove. In these embodiments, the method can continue to 54 at which a denoised version of the reference signal is generated, as further detailed hereinabove, and to 55 at which a timing offset among the signal receiving circuits is corrected as further detailed hereinabove.

In some embodiments of the present invention the method continues to 56 at which a database storing a digital terrain map describing height data of sources is accessed for extracting the third component (e.g., height) of the location vector z as further detailed hereinabove.

Operations 53 to 55 can in some embodiments of the present invention be performed at different times. Operation 56 may be based on interpolation of parameters such as, but not limited to, frequency and timing offsets of the receiving units.

The method can then continue to 57 at which the location of the source is estimated, as further detailed hereinabove.

The method ends at 58.

Different operations of the method can be executed by different components of system 10 and at different locations. For example, operations 51, 52 and 54 can be executed by signal receiving circuits 16 at their location, operation 53 can be executed by reference source(s) 24 at its location, and operations 55, 56 and 57 can be executed by central processor circuit 22 at its location.

As used herein the term "about" refers to ±10.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

A known method of radiolocation relies on estimation of TDOA between several receiving stations. This can be followed by estimation of a location fitting the TDOAs. Sometimes FDOA is also estimated, which makes it possible to estimate the velocity of the source. The estimation of TDOA and possibly FDOA relies on cross correlation of the signal received in various receiving stations (RS). In traditional systems the signal is transmitted from one RS to another or from multitude RSs to a central processor (CP). The present example presents a technique that circumvents the costly transmission while preserving, and optionally improves the quality of the TDOA FDOA estimation.

The signal transmitted by practical, low cost, transmitters is not exactly the one dictated by the modulation standard, but deviates from it by certain deformities. These may be expressed by some parameters the value of which is not known in advance.

In this example each of the signal receiving circuits is equipped with down-conversion, filtering and sampling capabilities, digital processor and storage, all configured to detect the presence of a digital signal of the specified type. This is followed by a model-based denoising process, according to some embodiments of the present invention. In this Example, the baseband signal is demodulated, to provide a set of the modulating bits of the signal. The modulating bits are then re-modulated, to obtain a synthetic signal that is substantially devoid of any deformation from the known modulation standard. The synthetic signal is compared with the received signal to estimate the deformation parameters, which are in turn used to deform the synthetic signal. This provides the denoised version of the signal.

The received signal and its denoised version are aligned in time and frequency, accurately to the level needed by accurate location. Since the denoised version is obtained by the demodulation and modulation, the start time of each symbol is typically an integer (in sample units), unlike the signal received by the signal receiving circuit. Thus, estimation of TDOA and/or FDOA between the signal received by the signal receiving circuit and its denoised version can be used to align the denoised version of the signal with the received signal in time, frequency, amplitude and phase. The SINR of the received signal can optionally and preferably also be estimated.

It is recognized by the Inventor that the denoised version of the signal provides improvement in the TDOA and/or FDOA performance, since the aforementioned model-based denoising makes the denoised version of the signal substantially free of noise, interference and multipath effects.

A further improvement is provided by transmitting the set {p} of signal parameters instead of the signal itself or its denoised version. In this Example, the set {p} of signal parameters includes the modulating bits, the deformation parameters, the complex amplitude, and the exact frequency and time. Such a set of signal parameters is sufficient for the central processor circuit 22 to reconstruct the denoised version of the signal. Thus, the signal receiving circuits 16 transmit to the central processor circuit 22 the sets {p} without transmitting the denoised versions of the signal and without transmitting the signal itself. This results in lower demands in data transfer between signal receiving circuits 16 and central processor circuit 22.

Some transmission methods divide the signal into bursts which are separated in time and frequency and where the amplitude and phase of each burst is not dictated by the modulation standard. In such a case, filter bank 28 is applied to the received signal to produce baseband versions of each burst and the aforementioned model-based denoising process is applied separately to the baseband version of each burst.

The central processor circuit 22 can use the time tags to associate sets to the various signal receiving circuits 16. Central processor circuit 22 then uses knowledge about timing-frequency scheduling of transmission to associate different bursts to the same signal.

An optional stationary source (e.g., reference source 24) which is reference at a known location is equipped with a transmitter which transmits a reference digital signal, not necessarily of the same type as used by the source 12. The reference signal can be transmitted repeatedly or upon request from the central processor circuit 22. The reference signal is processed by the signal receiving circuits 16 and central processor circuit 22 in the same way as the target signal.

Since the location of the reference source 24 is known, the true TDOA between any pair of signal receiving circuits 16, for the reference signal is also known: it is the difference between propagation times from the location of the reference source 24 to the respective signal receiving circuits 16. The true FDOA between signal receiving circuits 16 for the reference signal is typically zero, since the reference sources is stationary. The difference between the true and estimated TDOA is thus a timing offset between the clocks of the two signal receiving circuits, and may be used to neutralize the effect of such offset on the desired TDOA result. The difference between the true and estimated FDOA is thus a frequency offset between the local oscillators of the two signal receiving circuits and may be used to neutralize the effect of such offset on the target FDOA result.

The location and velocity of the source can now be estimated by converting the TDOA to location and the FDOA to velocity as known in the art.

Following is a simplified example for obtaining a corrected TDOA and FDOA for a pair of signal receiving circuits using a reference signal from a reference source. Suppose that the TDOA as estimated at the central processor circuit 22 is 1.002 ms for the signal 14 and 1.005 for the reference signal 26, and that that the FDOA as estimated at the central processor circuit 22 is 1006 Hz for the signal 14 and 1001 Hz for the reference signal 26 (see FIG. 1). These estimates contain the effects of time and frequency offsets between the two signal receiving circuits.

Since the reference source is stationary at a known location, the TDOA and FDOA that correspond to the reference signal 26 can be geometrically computed by the central processor circuit 22. Suppose further that these geometrically computed TDOA and FDOA values are 0.001 ms and 0 Hz, respectively. The central processor circuit 22 can then determine that there is timing offset $\Delta t$ of 0.001−1.005=−1.004 ms and a frequency offset $\Delta f$ of 0−1001=−1001 Hz. The corrected values of the TDOA and FDOA for signal 14 can then be calculated by shifting each of these values by the respective offset, to obtain a corrected TDOA of 1.002+$\Delta t$=−0.002 ms, and a corrected FDOA of 1006+$\Delta f$=5 Hz.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

In addition, any priority document(s) of this application is/are hereby incorporated herein by reference in its/their entirety.

What is claimed is:

1. A system for estimating a location of a source transmitting a signal having a known modulation standard, the system comprising:
a plurality of signal receiving circuits, each configured to receive the signal, to generate a denoised version of the signal based on the modulation standard by deforming a synthetic signal, and to provide a set of signal parameters describing said denoised version of the signal, wherein said set of signal parameters comprises at least three parameters selected from the group consisting of modulating bits encoded in the received signal, deformation parameters characterizing said deformation, a frequency of the signal, amplitude of the signal, a phase of the signal, and a time of arrival of the signal; and
a central processor circuit configured to receive data from each signal receiving circuit, and to estimate the location of the source based on said data, wherein for each signal receiving circuit, said data contain said set of signal parameters and are devoid of the received signal.

2. The system of claim 1, wherein said signal receiving circuit is configured for demodulating the received signal to provide said set of modulating bits encoded in the received signal, generating said synthetic signal modulated by said set of modulating bits, comparing said received signal with said synthetic signal and estimating said deformation parameters based on said comparison.

3. The system according to claim 2, wherein said set of parameters comprises said set of modulating bits.

4. The system according to claim 2, wherein said set of parameters comprises parameters describing said deformation.

5. The system according to claim 1, wherein the signal comprises a plurality of signal bursts, each characterized by a separate carrier frequency, wherein said receiving circuit is configured for generating a denoised version separately for each signal burst.

6. The system according to claim 5, wherein said central processor circuit is configured to access a computer-readable medium, to read from said medium timing-frequency scheduling of said signal bursts, and to classify sets of signal parameters according to said signal receiving circuits.

7. The system according to claim 1, wherein the signal comprises a plurality of signal bursts, each characterized by a separate carrier frequency and different modulating bits, wherein said receiving circuit is configured for generating a denoised version separately for each signal burst.

8. The system according to claim 1, further comprising a reference source transmitting a reference signal, wherein each signal receiving circuit is configured to generate a denoised version of the reference signal, and to extract from said denoised version of the reference signal a set of reference signal parameters describing said denoised version of the reference signal, and wherein said central processor circuit is configured to estimate the location of the source also based on said reference signal parameters and on the location of said reference source.

9. The system according to claim 8, wherein said reference signal is a digital signal.

10. The system according to claim 8, wherein said central processor circuit is configured to correct at least one a timing offset and frequency offset among said signal receiving circuits based on said reference signal parameters.

11. The system according to claim 1, wherein said estimation is an indirect estimation, and said central processor circuit is configured to calculate, based on said sets of signal parameters, at least one set of values selected from the group consisting of Time Difference Of Arrival (TDOA) values and Frequency Difference Of Arrival values between pairs of signal receiving circuits, and to estimate the location based on said TDOA values.

12. The system according to claim 1, wherein said central processor circuit is configured to access a database storing a digital terrain map describing height data of sources and to extract from said map a height of said source, and wherein said estimation based is executed in two spatial dimensions and combined with said extracted height.

13. The system according to claim 1, wherein said set of parameters comprises said phase of the signal.

14. A method for estimating a location of a source transmitting a signal having a known modulation standard, the method comprising:
at each of a plurality of signal receiving circuits, receiving the signal, generating a denoised version of the signal based on the modulation standard by deforming a synthetic signal, and providing a set of signal parameters describing said denoised version of the signal, wherein said set of signal parameters comprises at least three parameters selected from the group consisting of modulating bits encoded in the received signal, deformation parameters characterizing said deformation, a frequency of the signal, amplitude of the signal, a phase of the signal, and a time of arrival of the signal;
from each signal receiving circuit, transmitting data to a central processor circuit, said data containing said set of signal parameters and are devoid of the received signal; and
at said central processor circuit, estimating the location of the source based on data transmitted by said plurality of signal receiving circuits.

15. The method according to claim 14, wherein said set of parameters comprises said set of modulating bits encoded by said received signal.

16. The method according to claim 14, wherein the signal comprises a plurality of signal bursts, and wherein the method comprises receiving from each of said plurality of signal receiving circuits a separate set of signal parameters for each signal burst.

17. The method according to claim 14, further comprising receiving from at least one of said plurality of signal receiving circuits a set of reference signal parameters describing a denoised version of a reference signal transmitted by a reference source and received by said at least one signal receiving circuit, wherein said estimation of the location of the source is also based on said reference signal parameters an on a location of said reference source.

18. A method of generating signal information for estimating a location of a source transmitting a signal having a known modulation standard, the method comprising:
generating a denoised version of the signal based on the modulation standard by deforming a synthetic signal;
extracting from said denoised version of the signal a set of signal parameters comprising at least three parameters selected from the group consisting of modulating bits encoded in the signal according to the modulation standard, deformation parameters characterizing said deformation, a frequency of the signal, amplitude of the signal, a phase of the signal, and a time of arrival of the signal; and
transmitting said set of signal parameters, but not the signal to a central processor circuit for estimating the location of the source based on said signal parameters.

19. The method of claim 18, wherein said generating said denoised version of the signal comprises:
demodulating a baseband of the received signal based on the modulation standard to provide a set of said modulating bits encoded by the signal;
generating said synthetic signal modulated by said set of modulating bits; and
estimating said deformation parameters based on a comparison between said received signal and said synthetic signal.

20. The method according to claim 19, wherein said set of parameters comprises at least one of (i) said set of modulating bits, and (ii) said deformation parameters.

21. The method according to claim 18, wherein the signal comprises a plurality of signal bursts, each characterized by a separate frequency, and wherein the method comprises generating a denoised version separately for each signal burst.

22. The method according to claim 18, wherein the signal comprises a plurality of signal bursts, each characterized by a separate frequency and different modulating bits, and wherein the method comprises generating a denoised version separately for each signal burst.

23. The method according to claim 18, further comprising:
receiving a reference signal from a reference source transmitting said reference signal;
generating a denoised version of the reference signal;
extracting from said denoised version of the reference signal a set of reference signal parameters describing said denoised version of the reference signal; and
transmitting said set of reference signal parameters to said central processor circuit for estimating the location of the source, based on said reference signal parameters and on a location of said reference source.

* * * * *